(12) United States Patent
Terauchi (10) Patent No.: US 10,721,365 B2
(45) Date of Patent: Jul. 21, 2020

(54) IMAGE READING DEVICE AND IMAGE FORMING APPARATUS HAVING SELECTIVELY SWITCHABLE REFERENCE SURFACES

(71) Applicant: Hiroki Terauchi, Kanagawa (JP)

(72) Inventor: Hiroki Terauchi, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 16/253,177

(22) Filed: Jan. 21, 2019

(65) Prior Publication Data

US 2019/0230229 A1  Jul. 25, 2019

(30) Foreign Application Priority Data

Jan. 24, 2018  (JP) .................. 2018-009885

(51) Int. Cl.
*H04N 1/60* (2006.01)
*H04N 1/00* (2006.01)
*G03G 15/22* (2006.01)

(52) U.S. Cl.
CPC ....... *H04N 1/00013* (2013.01); *G03G 15/221* (2013.01); *H04N 1/00063* (2013.01); *H04N 1/00079* (2013.01); *H04N 1/00084* (2013.01)

(58) Field of Classification Search
CPC ........... H04N 1/00029; H04N 1/00013; H04N 1/00063; H04N 1/00084
USPC .................................... 358/518, 504
See application file for complete search history.

(56) References Cited

FOREIGN PATENT DOCUMENTS

| JP | 2010-114498 | 5/2010 |
| JP | 2010114498 A | * 5/2010 |

* cited by examiner

*Primary Examiner* — Jamares Q Washington
(74) *Attorney, Agent, or Firm* — Duft & Bornsen, PC (57) ABSTRACT

An image reading device includes a reader, an opposing member, and circuitry. The reader is configured to read an image of an object to be conveyed. The opposing member has a plurality of opposing portions that include reference surfaces selectively switchable to be placed at a reading position of the reader. The reference surfaces include two or more identical reference surfaces. The circuitry is configured to determine whether an evaluation reading value of reading values read by the reader on each of the two or more identical reference surfaces is within a prescribed range and perform correction operation of the image reading device with the evaluation reading value within the prescribed range out of the reading values of the two or more identical reference surfaces.

12 Claims, 7 Drawing Sheets

IMAGE READING DEVICE AND IMAGE FORMING APPARATUS HAVING SELECTIVELY SWITCHABLE REFERENCE SURFACES

CROSS-REFERENCE TO RELATED APPLICATION

This patent application is based on and claims priority pursuant to 35 U.S.C. § 119(a) to Japanese Patent Application No. 2018-009885, filed on Jan. 24, 2018, in the Japan Patent Office, the entire disclosure of which is hereby incorporated by reference herein.

BACKGROUND

Technical Field

The present invention relates to an image reading device and an image forming apparatus.

Related Art

Conventionally, there is a known image reading device including: a reader to read an image of an object to be conveyed; and an opposing member having a plurality of opposing portions having reference surfaces selectively switched to be arranged at a reading position of the reader.

SUMMARY

In an aspect of the present disclosure, there is provided an image reading device that includes a reader, an opposing member, and circuitry. The reader is configured to read an image of an object to be conveyed. The opposing member has a plurality of opposing portions that include reference surfaces selectively switchable to be placed at a reading position of the reader. The reference surfaces include two or more identical reference surfaces. The circuitry is configured to determine whether an evaluation reading value of reading values read by the reader on each of the two or more identical reference surfaces is within a prescribed range and perform correction operation of the image reading device with the evaluation reading value within the prescribed range out of the reading values of the two or more identical reference surfaces.

In another aspect of the present disclosure, there is provided an image reading device that includes a reader, an opposing member, and circuitry. The reader is configured to read an image of an object to be conveyed. The opposing member has a plurality of opposing portions including reference surfaces selectively switchable to be placed at a reading position of the reader, the reference surfaces including two or more identical reference surfaces. The circuitry is configured to determine whether an evaluation reading value of reading values read by the reader on each of the two or more identical reference surfaces is within a prescribed range, and perform correction operation of the image reading device with a reading value at a reading position within the prescribed range excluding reading positions outside the prescribed range when all the evaluation reading values of the two or more identical reference surfaces are outside the prescribed range.

In still another aspect of the present disclosure, there is provided an image forming apparatus that includes the image reading device according to any one of the above-described aspects to read an image.

BRIEF DESCRIPTION OF THE DRAWINGS

A more complete appreciation of the disclosure and many of the attendant advantages and features thereof can be readily obtained and understood from the following detailed description with reference to the accompanying drawings, wherein:

FIG. 6 (including FIGS. 6A and 6B) is a flowchart illustrating a flow of specific shading (correction) operation of a white reference surface.

The accompanying drawings are intended to depict embodiments of the present invention and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present invention. As used herein, the singular forms "a", "an" and "the" are intended to include the plural forms as well, unless the context clearly indicates otherwise.

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

As an embodiment of the present disclosure, an image reading device 9 included in a color multifunction peripheral (MFP) (hereinafter referred to as a multifunction peripheral 500) that is an electrophotographic image forming apparatus and configured to read an image of a recording material such as a sheet after fixing with reference to the drawings.

Figure 1:
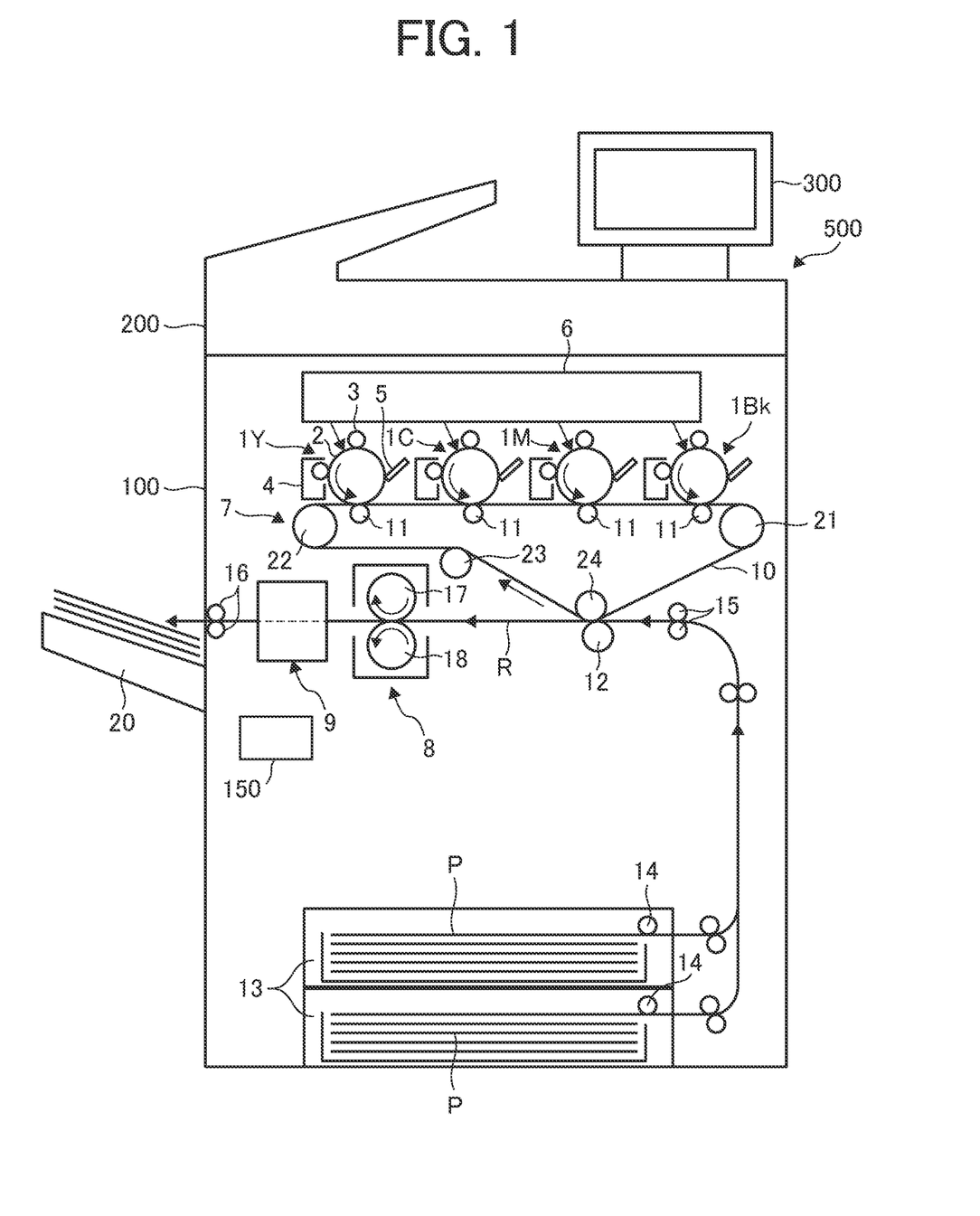
FIG. 1 is a schematic configuration diagram of a multifunction peripheral according to an embodiment.

FIG. 1 is a schematic configuration diagram of the multifunction peripheral 500 as an image forming apparatus according to the present embodiment.

First, a configuration and operation of the multifunction peripheral 500 according to the present embodiment will be described. As illustrated in FIG. 1, the multifunction peripheral 500 mainly includes the followings: That is, an apparatus main unit 100 as a main unit of the image forming apparatus, a scanner 200 attached to an upper part of the apparatus main unit 100 and configured to read a document, and a display-and-operation unit 300 attached so as to project upward and rearward of the scanner 200.

The scanner 200 scans a document mounted on a contact glass along with reciprocating movement of a first traveling body including a light source for document illumination, a mirror, or the like, and a second traveling body including a plurality of reflecting mirrors. A scanning light beam emitted from the second traveling body is focused by an image forming lens onto an image forming surface of a reading sensor installed behind the image forming lens and then read as an image signal by the reading sensor.

The display-and-operation unit 300 includes a liquid crystal panel having a pressure-sensitive touch panel and a speaker. Under the control of a main unit controller 150, the display-and-operation unit 300 displays an operation screen and a setting screen, and transmits selected (input) information to the main unit controller 150 while displaying each of the screens. In addition, under the control of the main unit controller 150, each of messages or information such as an operation status of each of parts, sheet supply to the user, toner supply, or warning are displayed on the liquid crystal panel or emitted as sounds from the speaker.

As illustrated in FIG. 1, the apparatus main unit 100 internally includes a tandem image forming part in which four process units 1Y, 1C, 1M, and 1Bk as image forming units arranged side by side. Each of the process units 1Y, 1C, 1M, and 1Bk is removably attached to the apparatus main unit 100, and has a similar configuration except that each of the units includes the toner with mutually different colors of yellow (Y), cyan (C), magenta (M), and black (Bk) corresponding to color separation components of a color image.

Specifically, each of the process units 1Y, 1C, 1M, and 1Bk includes: a drum-shaped photoconductor 2 as a latent image bearer; a charging roller 3 as a charger to charge the surface of the photoconductor 2; and a developing device 4 as a developing unit to form a toner image on the surface of the photoconductor 2. Each of the units further includes a cleaning blade 5 as a cleaner to clean the surface of the photoconductor 2. In FIG. 1, note that the photoconductor 2, the charging roller 3, the developing device 4, and the cleaning blade 5 included in the yellow process unit 1Y are denoted by reference numerals, omitting the reference numerals for the other process units 1C, 1M, and 1Bk.

An exposure device 6 as an exposure unit to expose the surface of the photoconductor 2 is disposed above the process units 1Y, 1C, 1M, and 1Bk. The exposure device 6 includes a light source, a polygon mirror, an f-O lens, and a reflecting mirror, and irradiates the surface of each of the photoconductors 2 with laser light on the basis of image data input from an external device such as a personal computer or from the scanner 200.

A transfer device 7 is disposed below each of the process units 1Y, 1C, 1M, and 1Bk. The transfer device 7 includes an intermediate transfer belt 10 including an endless belt as a transfer body. The intermediate transfer belt 10 is stretched over a plurality of stretching rollers 21, 22, 23, and 24, and one of the stretching rollers 21, 22, 23, and 24 rotates as a driving roller to allow the intermediate transfer belt 10 to circulate (rotate) in a direction indicated by an arrow in the drawing.

At positions opposed to the four photoconductors 2, four primary transfer rollers 11 as primary transfer units are disposed, respectively. Each of the primary transfer rollers 11 presses the inner peripheral surface of the intermediate transfer belt 10 at each position so as to form a primary transfer nip at a position where the pressed portion of the intermediate transfer belt 10 comes in contact with each of the photoconductors 2. Each of the primary transfer rollers 11 is connected to a power supply, and at least one of predetermined direct-current (DC) voltage and alternating-current (AC) voltage is applied to the primary transfer roller 11.

A secondary transfer roller 12 as a secondary transfer unit is disposed at a position facing one stretching roller 24 that stretches the intermediate transfer belt 10. The secondary transfer roller 12 presses the outer peripheral surface of the intermediate transfer belt 10 so as to form a secondary transfer nip at a position where the secondary transfer roller 12 comes in contact with the intermediate transfer belt 10. Similarly to the primary transfer roller 11, the secondary transfer roller 12 is connected to a power supply, and at least one of a predetermined direct-current (DC) voltage and alternating-current (AC) voltage is applied to the secondary transfer roller 12.

A plurality of sheet feed cassettes 13 each containing a recording material P as a sheet-shaped object such as a sheet of paper or an overhead projector (OHP) sheet is disposed at the bottom of the apparatus main unit 100. Each of the sheet feed cassettes 13 includes a sheet feed roller 14 that feeds the stored recording material P. A sheet ejection tray 20 that stocks the recording material P ejected to the outside of the apparatus is provided on the outer surface on the left side of the apparatus main unit 100 in the drawing.

The apparatus main unit 100 includes a conveyance path R disposed for conveying the recording material P from the sheet feed cassette 13 through the secondary transfer nip to the sheet ejection tray 20. In the conveyance path R, a registration roller 15 is disposed upstream of the position of the secondary transfer roller 12 in a recording medium conveyance direction. On the downstream of the position of the secondary transfer roller 12 in the recording material conveyance direction, a fixing device 8, an image reading device 9, and a pair of ejection rollers 16 are sequentially disposed.

The fixing device 8 includes, for example, a fixing roller 17 as a fixing member internally including a heater, and a pressure roller 18 as a pressure member to press the fixing roller 17. A fixing nip is formed at a position where the fixing roller 17 and the pressure roller 18 have been in contact with each other.

Here, the main unit controller 150 includes a central processing unit (CPU), a random access memory (RAM), a read only memory (ROM), a nonvolatile memory, and drivers for each of components. The main unit controller 150 loads a program or the like stored in the ROM or the nonvolatile memory onto the RAM, and performs calculation on the basis of the information from an external device, detection results of individual sensors, and input data from the display-and-operation unit 300, and then, communicates with a controller and a device of each of components to control them.

Hereinafter, basic operation when the multifunction peripheral 500 operates as a copying machine will be described.

After a document is mounted on a contact glass of the scanner 200 and a copy button (start button) of the display-and-operation unit 300 is pressed, reading of the document is started by the scanner 200. At the same time, the photoconductor 2 of each of the process units 1Y, 1C, 1M, and 1Bk is rotationally driven counterclockwise in the drawing, and the surface of each of the photoconductor 2 is uniformly charged to a predetermined polarity by the charging roller 3.

Then, the surface of each of the photoconductors 2 charged by the exposure device 6 is irradiated with laser light on the basis of the image information of the document read by the scanner 200, leading to formation of an electrostatic latent image on the surface of each of the photoconductors 2. At this time, the image information to be exposed on each of the photoconductors 2 is monochrome image information obtained by separating a desired full-color image into color information of yellow, cyan, magenta, and black. Toner is supplied to the electrostatic latent image formed on the photoconductor 2 by each of the developing devices 4, visualizing (forming a visible image of) the electrostatic latent image as a toner image.

One of the stretching rollers stretching the intermediate transfer belt 10 is rotationally driven so as to allow the intermediate transfer belt 10 to circulate in the direction of the arrow in the drawing. In addition, a constant voltage or constant-current-controlled voltage having a polarity opposite to the charging polarity of the toner is applied to each of the primary transfer rollers 11, leading to formation of a transfer electric field at the primary transfer nip between each of the primary transfer rollers 11 and each of the photoconductors 2. Thereafter, the toner images of the individual colors formed on the photoconductors 2 are sequentially superimposed and transferred onto the intermediate transfer belt 10 by the transfer electric field formed at the primary transfer nip. In this manner, the intermediate transfer belt 10 bears a full-color toner image on its surface. The toner on each of the photoconductors 2 that has not been completely transferred to the intermediate transfer belt 10 is removed by the cleaning blade 5.

Rotation of the sheet feed roller 14 allows the recording material P to be unloaded from the sheet feed cassette 13. The unloaded recording material P is transferred to a secondary transfer nip between the secondary transfer roller 12 and the intermediate transfer belt 10 at a timing determined by the registration roller 15. At this time, a transfer voltage having a polarity opposite to the toner charging polarity of the toner image on the intermediate transfer belt 10 is applied to the secondary transfer roller 12, leading to formation of a transfer electric field at the secondary transfer nip. The transfer electric field formed at the secondary transfer nip functions to transfer the toner image on the intermediate transfer belt 10 to be collectively transferred onto the recording material P.

Thereafter, the recording material P is transferred to the fixing device 8, and the recording material P is pressurized and heated by the fixing roller 17 and the pressure roller 18, resulting in fixation of the toner image on the recording material P. After the image formed by the image reading device 9 has been read, the recording material P is ejected to the sheet ejection tray 20 by the pair of ejection rollers 16. The toner image remaining on the recording material P at the secondary transfer nip is removed by a belt cleaning device provided to be opposed to the stretching roller 22 via the intermediate transfer belt 10 in preparation for the next image formation (printing).

The above description is image forming operation when a full-color image is formed on the recording material P. Alternatively, however, the multifunction peripheral 500 according to the present embodiment is capable of using any one of the four process units 1Y, 1C, 1M, and 1Bk to form a monochrome image or using two or three process units to form an image in two or three colors.

Next, the image reading device 9 will be described.

Figure 2:
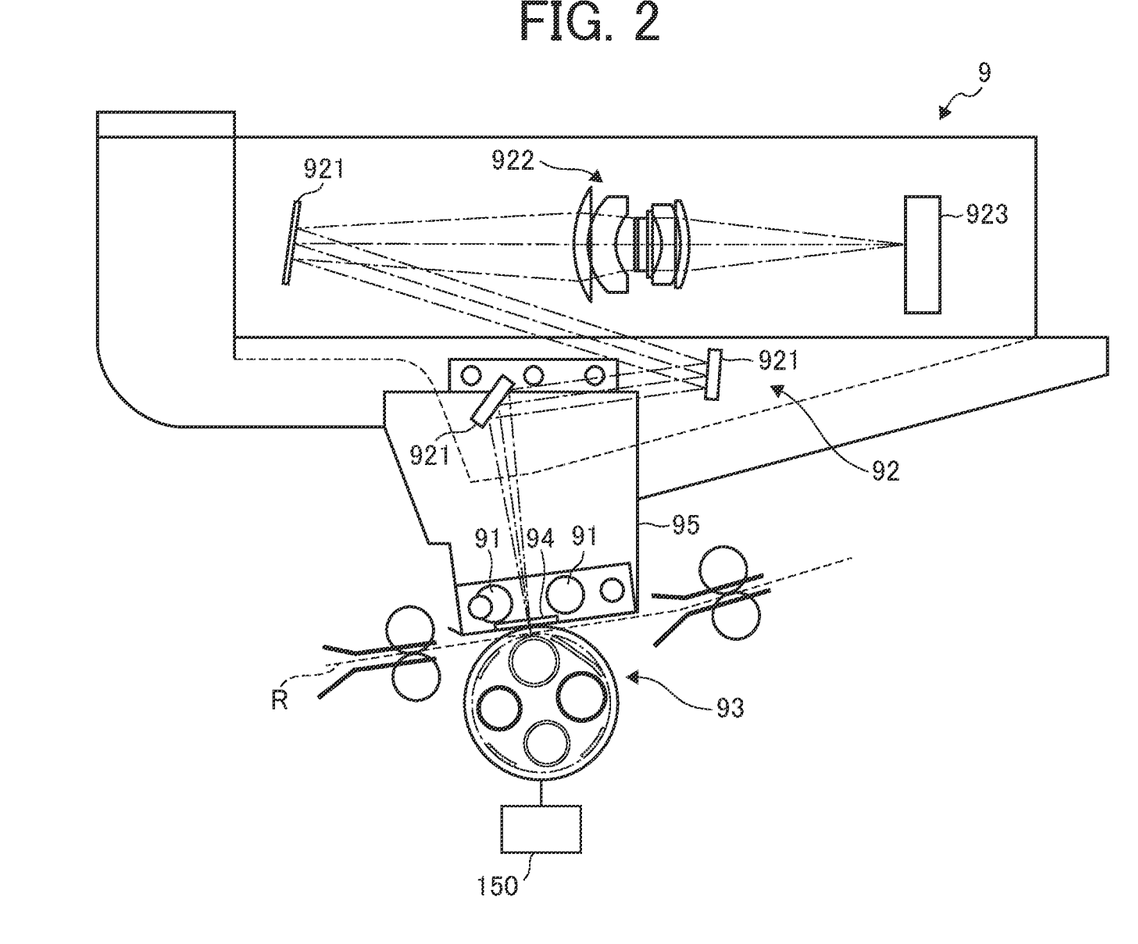
FIG. 2 is a side view of an image reading device.
Figure 3:
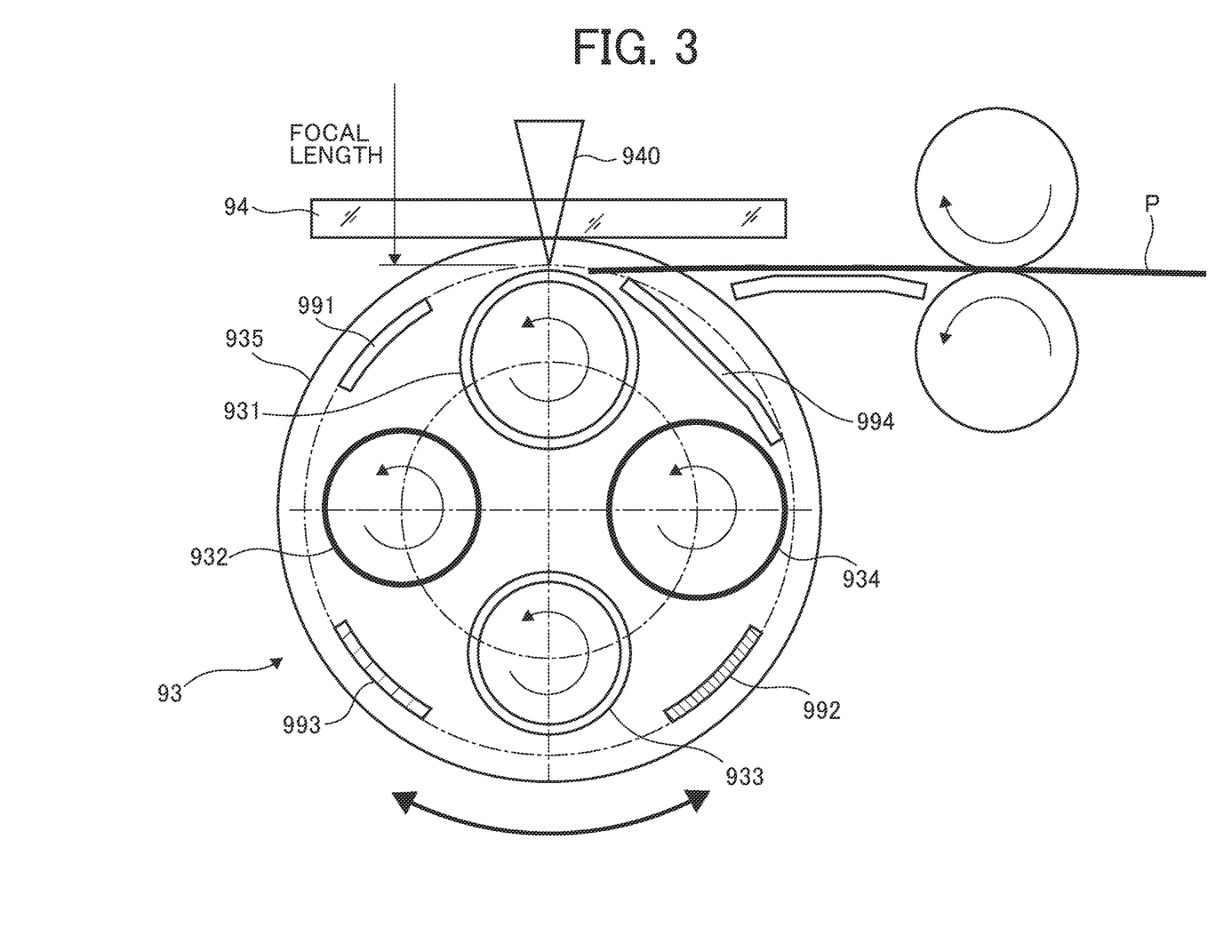
FIG. 3 is an enlarged view of an opposing member of an image reading device.

FIG. 2 is a side view of the image reading device 9. FIG. 3 is an enlarged view of an opposing member 93 of the image reading device 9.

As illustrated in FIG. 1, the image reading device 9 is provided on the downstream of the fixing device 8 in the conveyance direction of the recording material P. The image reading device 9 optically reads an image formed on the recording material P and generates image data representing an image to be inspected. The multifunction peripheral 500 performs correction processing of an image to be formed on the basis of the generated image data. Therefore, it is desirable to change the color of the opposing member 93 and the gap between the opposing member 93 and a contact glass 94 as the translucent member in accordance with the correction processing.

As illustrated in FIG. 2, the image reading device 9 includes an illumination light source 91, an image reader 92, the opposing member 93, the contact glass 94, and a support 95.

The illumination light source 91 is disposed on an image forming surface of the recording material P on which an image is formed when the recording material P is conveyed. The illumination light source 91 illuminates a reading position for reading an image from the recording material P on the conveyance path R of the recording material P, on which the recording material P passes through the image reading device 9.

The image reader 92 includes three reflectors 921, an image forming lens 922, and an image sensor 923. The three reflectors 921 guide reflected light from the image forming surface of the recording material P passing through the reading position from the reading position to the image forming lens 922. The image forming lens 922 focuses the reflected light from the image forming surface of the recording material P guided by the three reflectors 921 at the position of the image sensor 923. The image sensor 923 includes an imaging element and reads an image formed on the image forming surface of the recording material P. In addition, the image sensor 923 reads three reference surface members 991, 992, 993 or the like as curved surface opposing portions of the opposing member 93 illustrated in FIG. 3 in a state where the recording material P is not present. Then, the image sensor 923 receives the light focused by the image forming lens 922 and generates image data corresponding to the received light amount.

As illustrated in FIG. 3, the opposing member 93 includes: four rollers 931, 932, 933, and 934 as rotatable rotating bodies; three reference surface members 991, 992, and 993 as curved surface opposing portions having a reference surface; and a guide 994. The four rollers 931, 932, 933, and 934 are rotationally driven so as not to hinder the conveyance of the recording material P when the recording material P is conveyed to enable image reading at an appropriate focal length position of the image reader 92. The four rollers 931, 932, 933, and 934 are rotatably held by a roller bracket 935, and the three reference surface members 991, 992, and 993 and the guide 994 are fixedly held by the roller bracket 935. That is, in the configuration illustrated in FIG. 3, three reference surfaces and one guide plate are held at 90-degree intervals with respect to a cylinder including the roller bracket 935 or the like, and four rollers are held at positions shifted by 45 degrees.

Rotating the roller bracket 935 of the opposing member 93 allows the four rollers 931, 932, 933, and 934, the three reference surface members 991, 992, and 993, and the guide 994 to rotate together. This makes it possible for the opposing member 93 to selectively switch the four rollers 931, 932, 933, and 934, the reference surface members 991, 992, and 993, and the guide 994 to be arranged at a predetermined reading position at which the image reader 92 reads an image.

The distance from the contact glass 94 to the position of the proper focal length (reading position) is shortened to narrow the gap as a passage of the recording material P so as to suppress flapping of the recording material P and enable reading of the image at the proper focal length that achieves the focal length of the optical system of the image reader 92. Therefore, at the time of image reading for reading the image of the recording material P, at least the roller disposed at the reading position out of the four rollers 931, 932, 933, and 934 is rotationally driven to ensure reliable conveyance of the recording material P through the narrow gap.

In the example illustrated in FIG. 3, the proper focal length of the image reader 92 is set to the surface (refer to the outer one-dot chain line circle) when the recording material P is in contact with the roller 931 so as to minimize the gap between the contact glass 94 and the roller 931 as small as possible. During an image reading period in which an image is read while the recording material P is guided through this gap, the roller 931 is rotationally driven to achieve surface movement in the same direction as the conveyance direction of the recording material P. This configuration makes it possible to reduce the gap between the contact glass 94 and the roller 931 to suppress flapping of the recording material Pin conveyance, while the roller 931 comes in contact with the recording material P being conveyance and is rotated, leading to reliable conveyance of the recording material P without causing paper jam.

Meanwhile, before the image reading operation and between the conveyance of the recording material P, the opposing member 93 is rotated to arrange one of the three reference surface members 991, 992, and 993 at the reading position, and the reference surface member is read by the image reader 92 to perform each of correction operation such as shading correction operation. At this time, the outer surfaces of the reference surface members 991, 992, and 993 are arranged so as to match their positions with the position of the proper focal length (reading position) (refer to the outer one-dot chain line circle). In addition, during the correction operation, the conveyance of the recording material P is not performed so as to suspend entry of the recording material P into the reading position.

The above-described reference surface members 991, 992, and 993 are formed as fixing members that are not rotationally driven so that the reference surface members 991, 992, and 993 can fit in a space generated at a gap between adjacent rollers of the three rollers 931, 932, and 933.

Furthermore, each of the reference surface members 991, 992, and 993 has a curved surface shape having the rotation center of a rotary switching mechanism as a center such that the position and inclination of the reference surface would not change even when a stop angle error occurs in the rotary switching mechanism that rotates the opposing member 93. That is, the reference surface members 991, 992, and 993 are formed so that the outer arc has a curved surface shape having the distance from the rotation center of the roller bracket 935 to the reading position as radius of curvature (refer to the outer one-dot chain line circle). This makes it less demanding in stop accuracy when it comes to rotating the roller bracket 935 to arrange the reference surface members 991, 992, and 993 at the reading position and stop. This also eliminates the necessity to provide another space for arranging the reference surface members 991, 992, and 993, leading to space saving and miniaturization of the image reading device 9.

Here, in operation not involving image reading, that is, operation that simply involves conveyance of the recording material P without performing the image reading of the recording material P, there is no need to convey the recording material P while keeping it at a proper focus position. Accordingly, the recording material P is conveyed while the guide 994 functioning as a guiding unit is arranged on the opposite side of the reading position so as to achieve a gap amount that enables conveyance even without a conveying force of the roller at the reading position. During this operation not involving image reading, there is no need to rotationally drive the four rollers 931, 932, 933, or 934, and thus the rotation is stopped. In this manner, since the four rollers 931, 932, 933, and 934 stop rotational drive, it is possible to save energy at the time of operation not involving image reading.

Here, the main unit controller 150 as control circuitry controls the rotational driving position of the roller bracket 935 so as to selectively switch the four rollers 931, 932, 933, and 934, the reference surface members 991, 992, and 993 or the guide 994 so as to be arranged at the reading position.

Figure 4A:
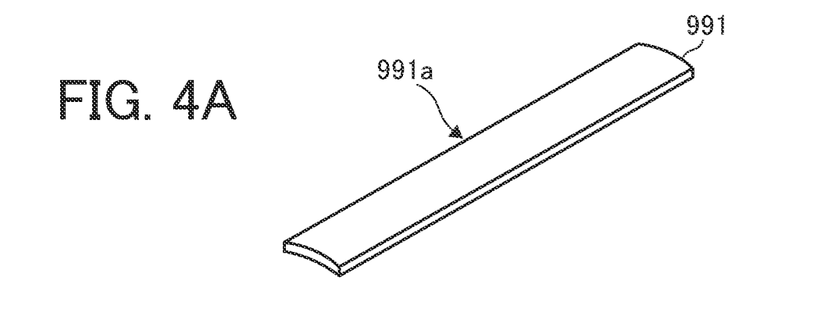
FIGS. 4A to 4D are perspective views of an example of three reference surface members and a guide.
Figure 4B:
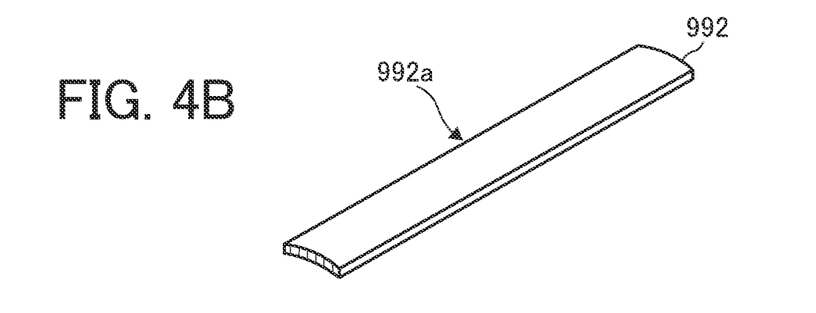
Figure 4C:
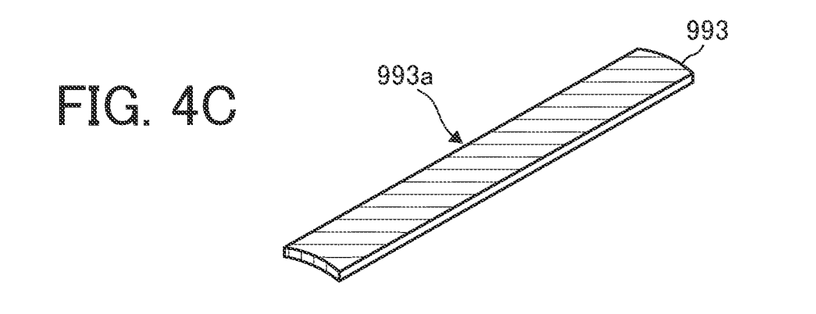
Figure 4D:
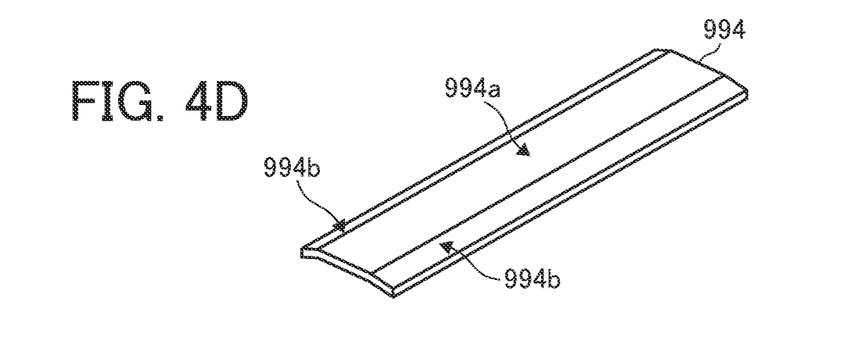
Figure 5:
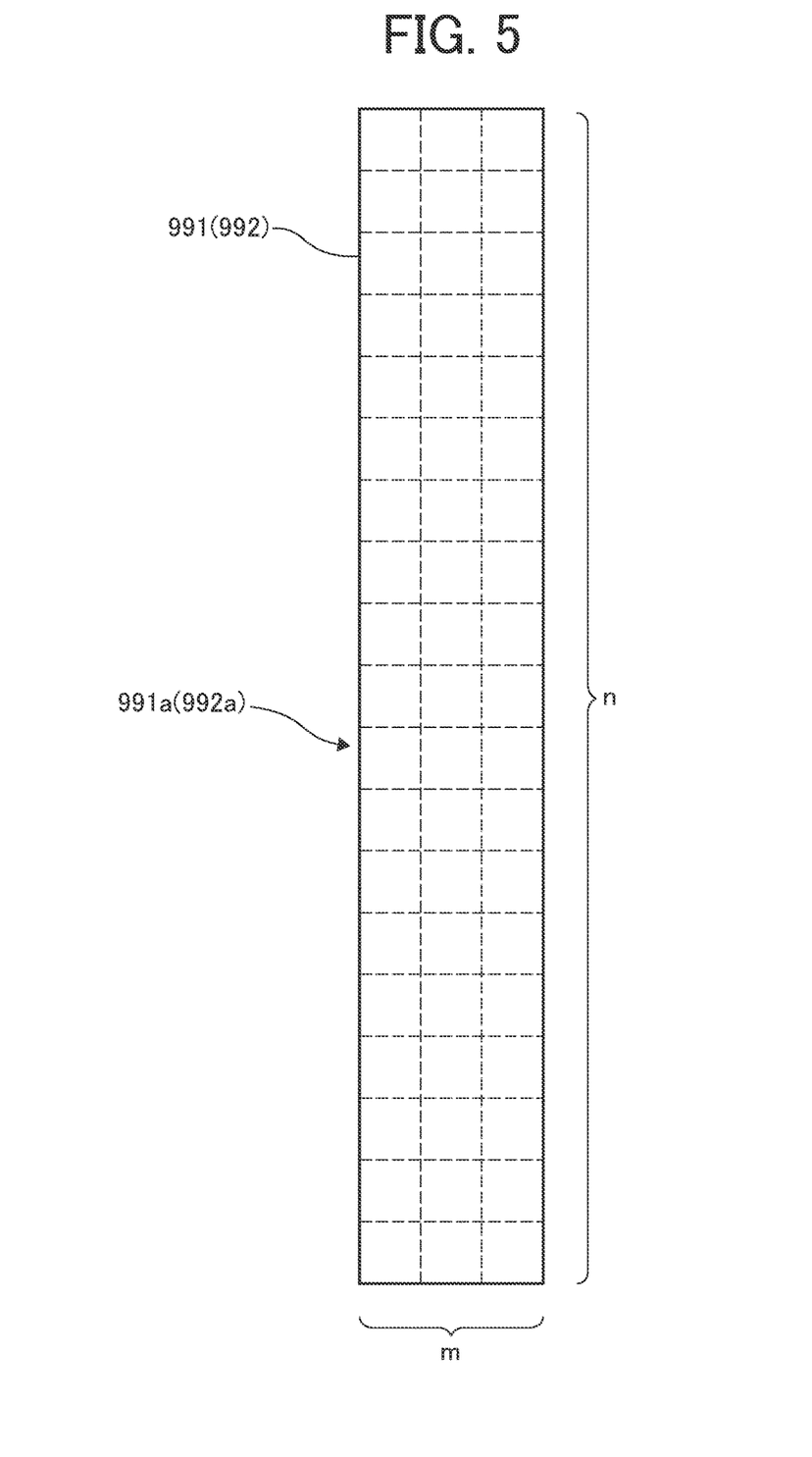
FIG. 5 is a view illustrating a reading grid when a first white reference surface and a second white reference surface are read by an image reader.

FIGS. 4A to 4D are perspective views illustrating an example of the three reference surface members 991, 992, and 993 and the guide 994. FIGS. 4A to 4C are specific perspective views illustrating an example of the reference surface members 991, 992, and 993, respectively. FIG. 4D is a specific perspective view illustrating an example of the guide 994. FIG. 5 is a view illustrating a reading grid when a first white reference surface 991a and a second white reference surface 992a are read by the image reader 92.

Here, the example of the present embodiment described below has a configuration in which the reference surface members 991 and 992 are defined as white reference surfaces and the reference surface member 993 is defined as a reference surface of black or another color. Note that similar applies to the case where a plurality of black reference surfaces and a plurality of color reference surfaces exist in addition to the case of the white reference surface.

The reference surface member 991 illustrated in FIG. 4A is a reference surface member including the first white reference surface 991a of a white uniform surface as a reference surface. The reference surface member 992 illustrated in FIG. 4B is also a reference surface member having a second white reference surface 992a of a white uniform surface as the reference surface. The reference surface members 991 and 992 respectively including the first white reference surface 991a and the second white reference surface 992a are used on the basis of the flowchart described below at execution of shading (correction) operation of the white reference surface.

Meanwhile, the reference surface member 993 illustrated in FIG. 4C is a reference surface member including a black or a non-white reference surface 993a having another color. This non-white reference surface 993a is used for shading operation of the reference surface of black or another color.

The guide 994 illustrated in FIG. 4D is a guide member formed of a plate-shaped member including a surface 994a and a flexure 994b. In execution of the above-described operation not involving image reading, the guide 994 functioning as a guiding unit is arranged at the reading position, and the recording material P is conveyed. In order to facilitate the passage of the recording material P, the guide 994 is opposed to the contact glass 94 with a wider gap than the reference surface members 991, 992, and 993, enabling the recording material P to be guided by the surface 994a of the guide 994. Accordingly, it is possible to reliably convey the recording material P while suppressing the conveying force to the recording material P to a low level.

Here, an example of a reading method and an evaluation method for a reading value when the first white reference surface 991a of the reference surface member 991 and the second white reference surface 992a of the reference surface member 992 are read by the image reader 92 will be described.

Representative examples include a method in which the first white reference surface 991a and the second white reference surface 992a to be read by the image reader 92 are divided into grids and read and a method in which a region satisfying a certain condition is read. It is possible to select any method in accordance with specifications of the image reading device or the like.

As for evaluation methods for the reading value, in addition to a method for using average values to be described next, there is also a method for obtaining average deviation of the reading values and weighting the reading value, or the like. It is possible to select an optimal method on the basis of the design concept of the image reading device.

The present embodiment adopts a method for reading by using divided grids. First, as illustrated in FIG. 5, values are obtained for each of grids divided into m divisions in a sub scanning line direction and n divisions in a main scanning line direction.

There are two cases in the flow of the shading operation to be described in the following. One is a case where an average value of the values obtained for each of the grids is used as each of the evaluation reading values of the first white reference surface 991a and the second white reference surface 992a. The other is a case of obtaining and using an average of the reading values of the grid satisfying a certain condition to be described below alone.

Next, a flow of specific shading (correction) operation of the white reference surface will be described with reference to the flowchart illustrated in FIG. 6.

Figures 6, 6A:
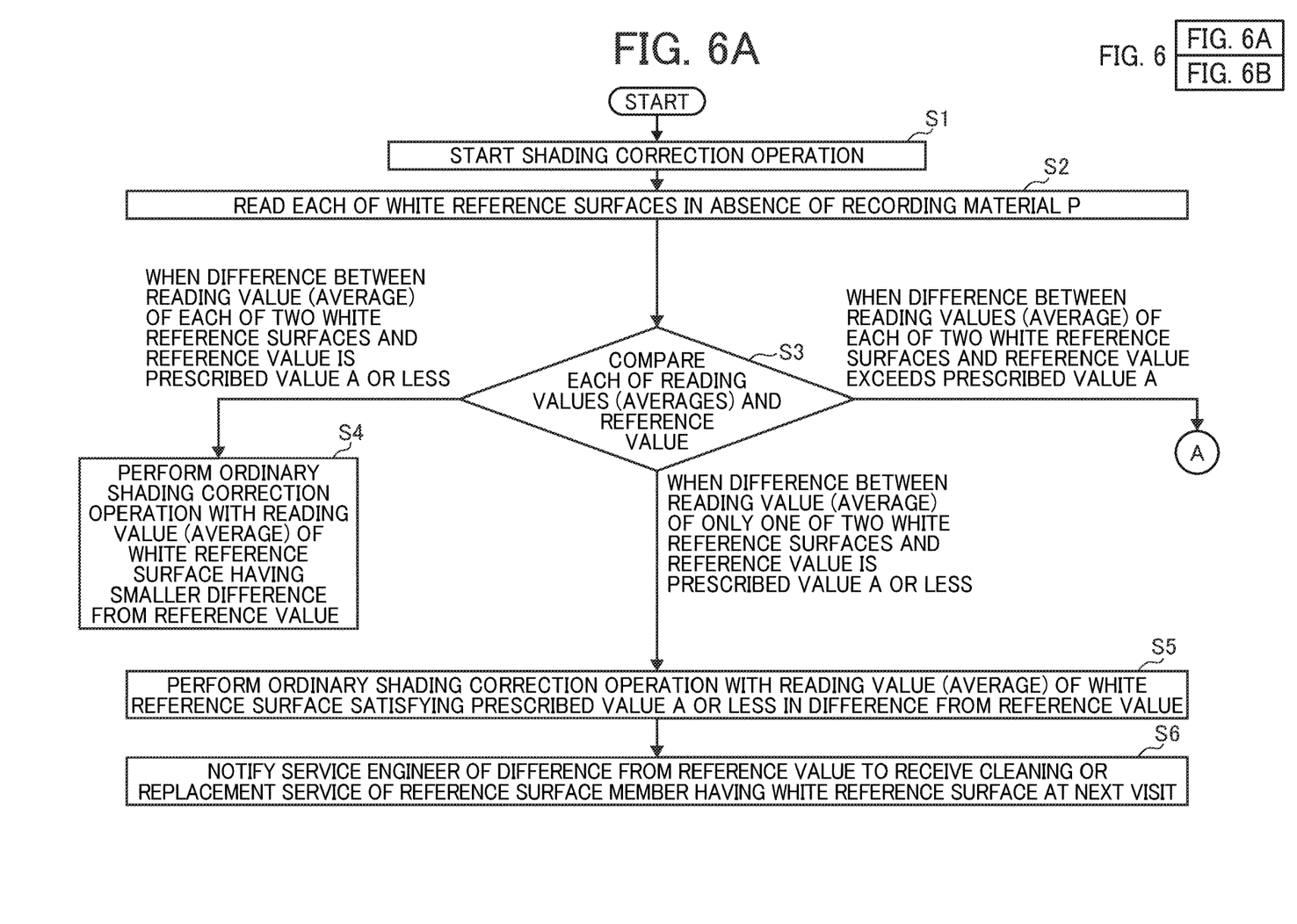
Figure 6B:
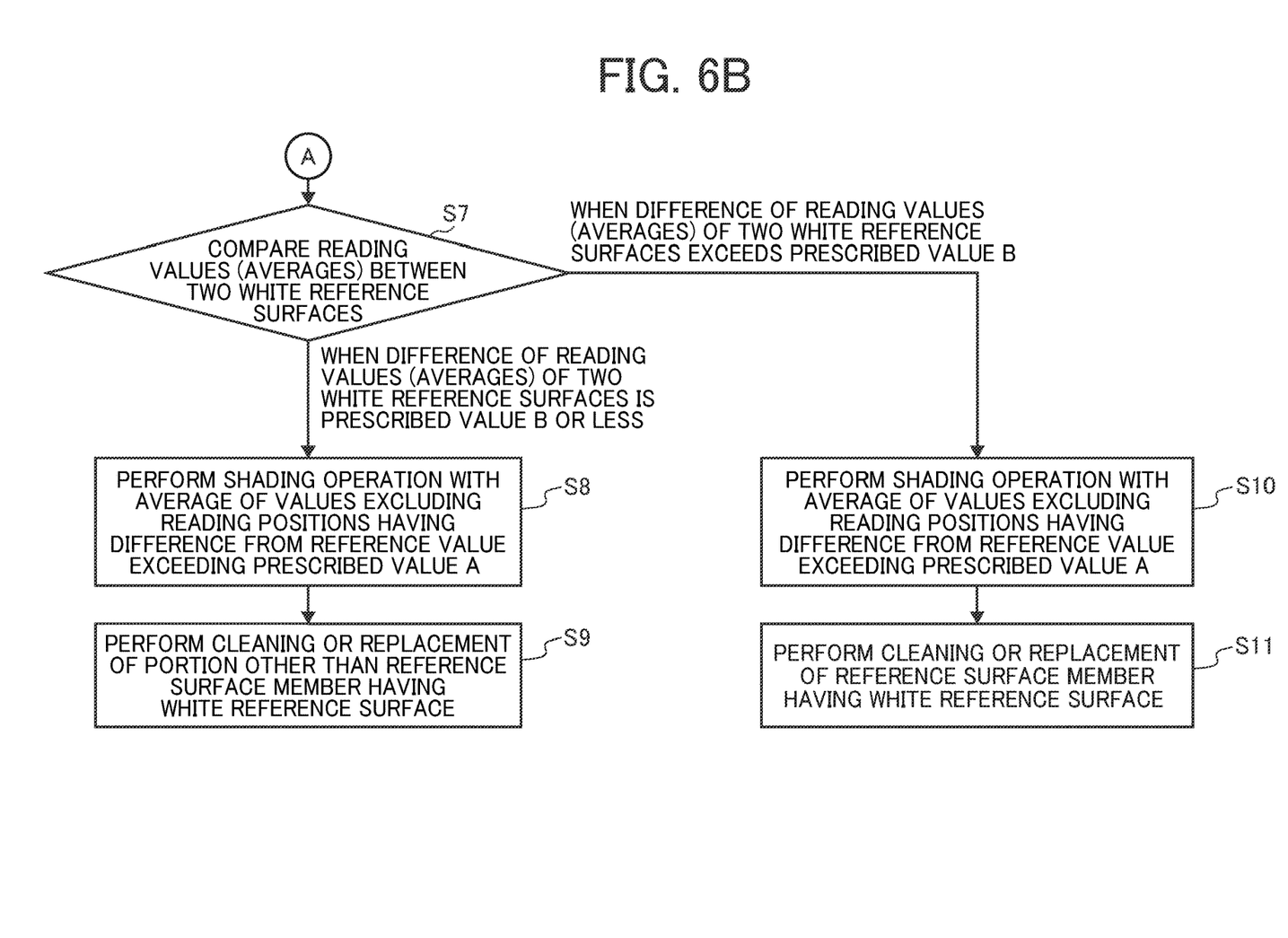

FIG. 6 (including FIGS. 6A and 6B) is a flowchart illustrating a flow of specific shading (correction) operation of the white reference surface.

The white shading operation is performed in accordance with the flowchart of FIG. 6 in the configuration in which the first white reference surface 991a and the second white reference surface 992a are white reference surfaces of white uniform surfaces.

In this shading operation, when the shading correction operation is started first (S1), each of the white reference surfaces 991a and 992a is read (S2) in a state where the recording material P is absent. In this reading, an average value of reading values for respective grids as illustrated in FIG. 5 is set as a reading value (average) as an evaluation reading value of each of the first white reference surface 991a and the second white reference surface 992a.

Next, the reading value (average) of each of the white reference surfaces 991a and 992a is compared with a reference value (S3). Here, the reference value may be a predetermined theoretical value, a previously measured value, or the like.

In comparison with the reference value, in a case where both the difference between the reading value (average) of the white reference surface 991a and the reference value and the difference between the reading value (average) of the white reference surface 992a and the reference value are a prescribed value A or less, the reading value (average) of the white reference surface having a smaller difference from the reference value A is used to perform ordinary shading correction operation (S4). Here, the prescribed value A may be set to the reference value×10%, or it may be determined in accordance with assumed variation.

In comparison with the reference value, in a case where only one of the difference between the reading value (average) of the white reference surface 991a and the reference value and the difference between the reading value (average) of the white reference surface 992a and the reference value is the prescribed value A or less, the reading value (average) of the white reference surface satisfying the prescribed value A or less is to be used to perform ordinary shading correction operation (S5). Additionally in this case, it is possible to notify a service engineer of data related to the white reference surface having a large difference from the reference value so as to receive cleaning and replacement services at the next visit (S6).

In comparison with the reference value, in a case where both the difference between the reading value (average) of the white reference surfaces 991a and the reference value and the difference between the reading value (average) of the white reference surface 992a and the reference value are greater than the prescribed value A, the reading values (averages) of the white reference surfaces 991a and 992a are compared with each other (S7).

In this comparison, in a case where the difference between the reading values of the two white reference surfaces 991a and 992a is a prescribed value B or less, it is considered that the reading values are shifted due to factors other than the individual white reference surfaces 991a and 992a. In this case, there is a need to perform cleaning or replacement of members other than the white reference surfaces 991a and 992a.

Note that in order to perform the shading operation without degrading the accuracy before the cleaning or replacement operation, the value of the reading position (grid) achieving the prescribed value A or less alone would be used to perform the shading operation excluding the reading value (grid point) deviating from the reference value (S8). Here, the prescribed value B is a value different from the prescribed value A, and is determined in advance as a value defined in consideration of reading value errors and other variations.

Thereafter, members such as the reference surface member 993 (non-white reference surface 993a) other than the reference surface members 991 and 992 respectively including the two white reference surfaces 991a and 992a, and the contact glass 94 are to be cleaned or replaced (S9).

Conversely, in a case where the difference between the reading values (average) of the two white reference surfaces 991a and 992a exceeds the prescribed value B, it is considered that the two white reference surfaces 991a and 992a are contaminated, and thus, there is a need to perform cleaning or replacement of each of the white reference surfaces 991a and 992a.

Note that in order to perform the shading operation without degrading the accuracy before the cleaning or replacement operation, the value of the reading position (grid) achieving the prescribed value A or less alone would be used to perform the shading operation excluding the measurement value (grid point) deviating from the reference value (S10), similarly to the case described above.

Thereafter, cleaning or replacement of the reference surface members 991 and 992 respectively including the two white reference surfaces 991a and 992a are performed (S11).

While the example described above with reference to the flowchart of FIG. 6 is the case of using two reference surface members including a white reference surface, the processing flow is similar in a case where two reference surface members including a reference surface in black or another color are used.

The present embodiment has been described with reference to the drawings as above. Note that the specific configuration is not limited to the configuration including the image reading device according to the present embodiment described above, and may be modified in design in a range not deviating from the scope of the present disclosure.

While the present embodiment described above is an example of the image reading device 9 included in the multifunction peripheral 500 of the electrophotographic method, the present disclosure is not limited to such a configuration and can be applied to an image reading device included in an inkjet type image forming apparatus.

Moreover, while the present embodiment described above is an example in which shading operation is performed as the correction operation performed on the image reading device 9, the present disclosure is not limited to such a configuration, and may be applied to a configuration that performs color reading calibration, for example.

The above description is merely an example, and specific effects are achieved for each of the following modes.

Aspect A

An image reading device, such as an image reading device 9, includes: a reader, such as the image reader 92, to read an image of an object, such as the recording material P, to be conveyed; and an opposing member, such as the opposing member 93, having opposing portions, such as the reference plane members 991, 992, and 993 and the guide 994. The opposing members, such as the reference surface members 991, 992, and 993, respectively include reference surfaces, such as the first white reference surface 991a, the second white reference surface 992a, and the non-white reference surface 993a, selectively switchable to be placed at a reading position of the reader. The reference surfaces of the plurality of opposing portions include two or more identical reference surfaces, such as the first white reference surface 991a and the second white reference surface 992a. The image reading device includes circuitry, such as the main unit controller 150, to determine whether an evaluation reading value, such as a reading value average, obtained by evaluating reading values read by the reader on each of the two or more identical reference surfaces is within a prescribed range, such as a sum of the predetermined reference value and the prescribed value A or less. The circuitry uses the evaluation reading value within the prescribed range, out of the reading values of the two or more identical reference surfaces, to perform correction operation of the image reading device.

According to Aspect A, for example, the following effect can be obtained.

Even in a case where contaminant adheres to all the identical reference surfaces, the evaluation reading value of the identical reference surface having an evaluation reading value within a prescribed range is used to perform the correction operation, making it possible to avoid using a reading value of the identical reference surface having unacceptable contamination. With this configuration, it is possible to reduce deterioration in accuracy of the correction operation due to contamination of the reference surface unlike a conventional configuration in which the reading value of the identical reference surface having unacceptable contamination is used in some cases.

Accordingly, it is possible to provide an image reading device capable of suppressing degradation of the accuracy of the correction operation using the reading values of two or more identical reference surfaces even in a case where all of the two or more identical reference surfaces are contaminated.

Aspect B

An image reading device, such as the image reading device 9, includes: a reader, such as the image reader 92, to read an image of an object, such as the recording material P, to be conveyed; and an opposing member, such as the opposing member 93, having opposing portions, such as the reference surface members 991, 992, and 993 and the guide 994. The opposing portions, such as the reference surface members 991, 992, and 993, respectively include reference surfaces, such as the first white reference surface 991a, the second white reference surface 992a, and the non-white reference surface 993a, selectively switchable to be placed at a reading position of the reader. The reference surfaces of the opposing portions include two or more identical reference surfaces, such as the first white reference surface 991a and the second white reference surface 992a. The image reading device includes circuitry, such as the main unit controller 150, to determine whether an evaluation reading value, such as a reading value average, obtained by evaluating reading values read by the reader on each of the two or more identical reference surfaces is within a prescribed range, such as a sum of the predetermined reference value and the prescribed value A or less. When all the evaluation reading values of the two or more identical reference surfaces are outside the prescribed range, the circuitry uses a reading value at a reading position within the prescribed range excluding reading positions, such as grids, outside the prescribed range, to perform correction operation of the image reading device, such as shading operation.

According to Aspect B, for example, the following effect can be obtained.

It is possible to perform the correction operation by using the reading value of the reading position where adhesion of contaminant is small even when contaminant adheres to all of the two or more identical reference surfaces and all of the evaluation reading values are outside the prescribed range. With this configuration, it is possible to suppress deterioration in accuracy of the correction operation due to contamination of the reference surface unlike a conventional configuration in which the reading value of the identical reference surface having unacceptable contamination is used in some cases.

Accordingly, it is possible to provide an image reading device capable of suppressing degradation of the accuracy of the correction operation using the reading values of two or more identical reference surfaces even in a case where all of the two or more identical reference surfaces are contaminated.

Aspect C

In Aspect A, in a case where there is a plurality of identical reference surfaces in which the evaluation reading value is within the prescribed range, an evaluation reading value closest to the reference value for the identical reference surface that is not contaminated is used to perform the correction operation.

Accordingly, it is possible to further suppress degradation of the accuracy of the correction operation using the reading values of two or more identical reference surfaces even in a case where all of the two or more identical reference surfaces are contaminated.

Aspect D

In Aspect A or Aspect C, in a case where all the evaluation reading values of the two or more identical reference surfaces are outside the prescribed range, a reading value at a reading position within the prescribed range, excluding reading positions such as grids outside the prescribed range, is to be used to perform the correction operation.

Accordingly, it is possible to further suppress degradation of the accuracy of the correction operation using the reading values of two or more identical reference surfaces even in a case where all of the two or more identical reference surfaces are contaminated.

Aspect E

In Aspect B or Aspect C, in a case where all the evaluation reading values of the two or more identical reference surfaces are outside the prescribed range, the evaluation reading values of the two or more identical reference surfaces are compared with each other, and in a case where a maximum value of a difference between the evaluation reading values of the two or more identical reference surfaces is a prescribed value such as the prescribed value B or less, cleaning or replacement is performed for a portion other than the two or more identical reference surfaces after the correction operation, and in a case where the maximum value exceeds the prescribed value, cleaning or replacement of the two or more identical reference surfaces is performed after the correction operation.

According to Aspect E, for example, the following effect can be obtained.

In a case where all the evaluation reading values are outside the prescribed range and the maximum value of the difference between the evaluation reading values of two or more identical reference surfaces is a prescribed value or less, it is highly likely that a portion other than the two or more identical reference surfaces is contaminated out of the plurality of opposing portions and that effects of this contamination is received by the identical reference surface. Accordingly, performing cleaning or replacement of portions excluding the two or more identical reference surfaces after the correction operation would make it possible to improve the accuracy of subsequent correction operation.

Conversely, in a case where all the evaluation reading values are outside the prescribed range and the maximum value of the difference between the reading values of two or more identical reference surfaces exceeds a prescribed value, it is highly likely that contaminant adheres to the two or more identical reference surfaces themselves. Accordingly, performing cleaning or replacement of the two or more identical reference surfaces after the correction operation would make it possible to improve the accuracy of subsequent correcting operation.

Aspect F

In Aspect A, Aspect C, and Aspect D, in a case where the evaluation reading value is outside the prescribed range on only one identical reference surface, the circuitry notifies, after the correction operation, a service engineer of a difference between the reference value for the identical reference surface that is not contaminated and the reading value.

According to Aspect F, for example, the following effect can be obtained.

It is possible to clean or exchange the identical reference surface having a reading value exceeding the first prescribed value at the next service visit by the service engineer.

Aspect G

In any of the Aspect A to Aspect F, a translucent member, such as the contact glass 94, is disposed between the reader and a conveyance path, such as the conveyance path R, on which the object is to be conveyed. The plurality of opposing portions includes a plurality of curved surface opposing portions each having a convexly curved reference surface, such as the outer peripheral surface of each of the rollers 931, 932, 933, and 934, including the identical reference surface, and the plurality of curved surface opposing portions is selectively switchable to be placed at a predetermined reading position opposed to the translucent member with a gap that permits passage of the object.

This enables configuration including the plurality of curved opposing portions having convexly curved reference surface, making it possible to selectively switch the plurality of curved surface opposing portions to be arranged at a predetermined reading position opposed to the translucent member in a gap that permits passage of the object. Therefore, unlike a conventional technique, it is possible to reduce the probability of occurrence of collision of the object to be conveyed in the conveyance path against a polygonal prism shaped corner portion of the opposing member and interruption of the conveyance that might lead to a conveyance failure of the object.

Aspect H

In any of the Aspect A to Aspect G, the identical reference surface is a white reference surface having a white color.

According to this, it is possible to provide an image reading device capable of suppressing deterioration of white color correction accuracy even in a case where at least one of two or more white reference surfaces is contaminated.

Aspect I

In any of Aspect A to Aspect G, the identical reference surface is a black reference surface having a black color.

According to this, it is possible to provide an image reading device capable of suppressing deterioration of black color correction accuracy even when at least one of two or more black reference surfaces is contaminated.

Aspect J

An image forming apparatus, such as the multifunction peripheral 500, includes an image reader that reads an image and an image reading device, such as the image reading device 9, according to any of Aspect A to Aspect I.

According to this, it is possible to provide an image forming apparatus capable of achieving the effects similar to the effects of any of the image reading devices according to Aspect A to Aspect I.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

Any one of the above-described operations may be performed in various other ways, for example, in an order different from the one described above.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions.

The invention claimed is:

1. An image reading device comprising:
 a reader configured to read an image of an object to be conveyed;
 an opposing member having a plurality of opposing portions that include reference surfaces selectively switchable to be placed at a reading position of the reader, the reference surfaces including two or more identical reference surfaces;
 circuitry configured to:
  determine whether an evaluation reading value of reading values read by the reader on each of the two or more identical reference surfaces is within a prescribed range; and
  perform correction operation of the image reading device with the evaluation reading value within the prescribed range out of the reading values of the two or more identical reference surfaces; and a translucent member between the reader and a conveyance path on which the object is to be conveyed, wherein the plurality of opposing portions includes a plurality of curved surface opposing portions, wherein the plurality of curved surface opposing portions has convexly curved reference surfaces including the two or more identical reference surfaces, and wherein the plurality of curved surface opposing portions is selectively switchable to be placed at a predetermined reading position opposed to the translucent member with a gap allowing passage of the object.

2. The image reading device according to claim 1, wherein, when evaluation reading values of a plurality of identical reference surfaces of the two or more identical reference surfaces are within the prescribed range, the circuitry performs the correction operation with one of the evaluation reading values closest to a reference value of the two or more identical reference surfaces that are not contaminated.

3. The image reading device according to claim 1, wherein, when all the evaluation reading values of the two or more identical reference surfaces are outside the prescribed range, the circuitry performs the correction operation with a reading value at a reading position within the prescribed range excluding reading positions outside the prescribed range.

4. The image reading device according to claim 1, wherein, when an evaluation reading value of only one identical reference surface of the two or more identical reference surfaces is outside the prescribed range, the circuitry performs the correction operation and notifies a service engineer of a difference between the evaluation reading value of the only one identical reference surface and a reference value of the two or more identical reference surfaces that are not contaminated.

5. The image reading device according to claim 1, wherein the two or more identical reference surfaces include white reference surfaces having a white color.

6. The image reading device according to claim 1, wherein the two or more identical reference surfaces include black reference surfaces having a black color.

7. An image forming apparatus comprising the image reading device according to claim 1 to read an image.

8. An image reading device comprising:
a reader configured to read an image of an object to be conveyed;
an opposing member having a plurality of opposing portions including reference surfaces selectively switchable to be placed at a reading position of the reader, the reference surfaces including two or more identical reference surfaces; and
circuitry configured to:
determine whether an evaluation reading value of reading values read by the reader on each of the two or more identical reference surfaces is within a prescribed range; and
perform correction operation of the image reading device with a reading value at a reading position within the prescribed range excluding reading positions outside the prescribed range when all the evaluation reading values of the two or more identical reference surfaces are outside the prescribed range; and
a translucent member between a conveyance path on which the object is to be conveyed and the reader,
wherein the plurality of opposing portions includes a plurality of curved surface opposing portions,
wherein the plurality of opposing portions has convexly curved reference surfaces including the two or more identical reference surface, and
wherein the plurality of curved surface opposing portions is selectively switchable to be placed at a predetermined reading position opposed to the translucent member with a gap allowing passage of the object.

9. The image reading device according to claim 8, wherein, when all the evaluation reading values of the two or more identical reference surfaces are outside the prescribed range,
the circuitry compares the evaluation reading values of the two or more identical reference surfaces with each other,
wherein, when a maximum value of a difference between the evaluation reading values of the two or more identical reference surfaces is a prescribed value or less, the circuitry performs the correction operation and performs cleaning or replacement of a portion other than the two or more identical reference surfaces,
wherein, when the maximum value exceeds the prescribed value, the circuitry performs the correction operation and performs cleaning or replacement of the two or more identical reference surfaces.

10. The image reading device according to claim 8, wherein the two or more identical reference surfaces include white reference surfaces having a white color.

11. The image reading device according to claim 8, wherein the two or more identical reference surfaces include black reference surfaces having a black color.

12. An image forming apparatus comprising the image reading device according to claim 8 to read an image.

* * * * *